US010626257B2

(12) United States Patent
Wu et al.

(10) Patent No.: US 10,626,257 B2
(45) Date of Patent: Apr. 21, 2020

(54) ADHESIVE COMPOSITION FOR RECLOSABLE MULTI-LAYER FILM

(71) Applicants: Dow Global Technologies LLC, Midland, MI (US); Rohm and Haas Company, Philadelphia, PA (US)

(72) Inventors: Xiaosong Wu, Freeport, TX (US); Daniel W. Himmelberger, Collegeville, PA (US); Lamy J. Chopin, III, Freeport, TX (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 91 days.

(21) Appl. No.: 15/576,038

(22) PCT Filed: May 17, 2016

(86) PCT No.: PCT/US2016/032894
§ 371 (c)(1),
(2) Date: Nov. 21, 2017

(87) PCT Pub. No.: WO2016/196000
PCT Pub. Date: Dec. 8, 2016

(65) Prior Publication Data
US 2018/0346699 A1  Dec. 6, 2018

Related U.S. Application Data

(60) Provisional application No. 62/168,376, filed on May 29, 2015.

(51) Int. Cl.

| | | |
|---|---|---|
| C08L 23/08 | (2006.01) | |
| C09J 153/00 | (2006.01) | |
| C08L 53/00 | (2006.01) | |
| B32B 7/12 | (2006.01) | |
| C08L 53/02 | (2006.01) | |
| C09J 7/38 | (2018.01) | |
| C08L 25/10 | (2006.01) | |
| B32B 27/32 | (2006.01) | |
| B32B 27/30 | (2006.01) | |
| B32B 27/06 | (2006.01) | |
| B32B 27/28 | (2006.01) | |

(52) U.S. Cl.
CPC ............ *C08L 23/0815* (2013.01); *B32B 7/12* (2013.01); *B32B 27/06* (2013.01); *B32B 27/28* (2013.01); *B32B 27/30* (2013.01); *B32B 27/302* (2013.01); *B32B 27/32* (2013.01); *C08L 25/10* (2013.01); *C08L 53/00* (2013.01); *C08L 53/02* (2013.01); *C09J 7/387* (2018.01); *C09J 153/00* (2013.01); *B32B 2405/00* (2013.01); *B32B 2439/70* (2013.01); *C08L 2203/162* (2013.01); *C08L 2205/02* (2013.01)

(58) Field of Classification Search
None
See application file for complete search history.

(56) References Cited

U.S. PATENT DOCUMENTS

| | | |
|---|---|---|
| 5,378,536 A | 1/1995 | Miller et al. |
| 6,737,130 B2 | 5/2004 | Ferri |
| 7,422,782 B2 | 9/2008 | Haedt et al. |
| 7,608,668 B2 | 10/2009 | LiPiShan et al. |
| 7,858,706 B2 | 12/2010 | Arriola et al. |
| 7,893,166 B2 | 2/2011 | LiPiShan et al. |
| 7,927,679 B2 | 4/2011 | Cruz et al. |
| 7,947,793 B2 | 5/2011 | Marchand et al. |
| 8,921,474 B2 | 12/2014 | Alper et al. |
| 9,688,442 B2 | 6/2017 | Lyzenga et al. |
| 9,914,860 B2 * | 3/2018 | Himmelberger ........ C08L 53/00 |
| 10,005,934 B2 * | 6/2018 | Himmelberger ....... C09J 153/00 |
| 2004/0067357 A1 | 4/2004 | Engelaere |
| 2005/0255196 A1 | 11/2005 | Opuszko et al. |
| 2007/0003722 A1 | 1/2007 | Engelaere |
| 2007/0082161 A1 | 4/2007 | Cruz et al. |
| 2007/0212504 A1 | 9/2007 | Engelaere |
| 2008/0081183 A1 | 4/2008 | De Boer |
| 2011/0021103 A1 * | 1/2011 | Alper ....................... B32B 5/26 442/329 |
| 2011/0162993 A1 | 7/2011 | Cruz |
| 2012/0165455 A1 | 6/2012 | Vitrano et al. |
| 2013/0121623 A1 | 5/2013 | Lyzenga et al. |
| 2014/0079343 A1 | 3/2014 | Lyzenga et al. |
| 2014/0185965 A1 | 7/2014 | Lyzenga |
| 2014/0256867 A1 * | 9/2014 | Puerkner ................. C09J 153/00 524/505 |
| 2014/0335299 A1 | 11/2014 | Wang et al. |

(Continued)

FOREIGN PATENT DOCUMENTS

| | | | | |
|---|---|---|---|---|
| EP | 2143557 A1 | 1/2010 | | |
| WO | WO-2014172179 A1 * | 10/2014 | ............ | C09J 153/00 |
| WO | WO-2015026701 A1 * | 2/2015 | .............. | C08L 53/00 |

OTHER PUBLICATIONS

A. Dobrynin, J. Chem. Phys. 107(21), Dec. 1, 1997, pp. 9234-9238.

(Continued)

*Primary Examiner* — Satya B Sastri
(74) *Attorney, Agent, or Firm* — Quarles & Brady LLP

(57) ABSTRACT

The present disclosure provides a composition. In an embodiment, the composition includes:
A) an ethylene/α-olefin multi-block copolymer having a melt index from 0.2 g/10 min to 8.0 g/10 min;
B) a styrenic block polymer comprising from greater than 1 wt % to less that 50 wt % units of polymerized styrene;
C) a tackifier;
D) an oil; and the composition has a melt index from 3 g/10 min to 50 g/10 min.

The composition is suitable for use as a pressure sensitive adhesive layer in a reclosable packaging structure.

9 Claims, No Drawings

(56) References Cited

U.S. PATENT DOCUMENTS

2016/0052242 A1 2/2016 Breed et al.
2016/0053143 A1 2/2016 Himmelberger et al.
2017/0233158 A1 8/2017 Lyzenga et al.

OTHER PUBLICATIONS

I. Potemkin et al., Physical Review E, vol. 57, No. 6, Jun. 1998, pp. 6902-6912.
T. Williams, Polymer Letters, vol. 6, 1968, pp. 621-624.

* cited by examiner

ADHESIVE COMPOSITION FOR RECLOSABLE MULTI-LAYER FILM

BACKGROUND

In the food packaging industry, demand for convenience features is a growing trend, with consumers looking for packaging that can be easily handled and used. Reclosability in packaging not only offers consumer convenience, but also provides longer shelf life of the packaged product without the need to transfer contents into a separate reclose package, such as a food storage bag, Ziploc bag, for example.

Reclosable packaging structures are achieved by designing a multilayer structure in such a way that the interfacial strength between the sealant layer and an adjacent delamination layer with adhesive functionality is lower than the strength between the seal layer and the film structure. When the multilayer film is pulled from a container, the sealant layer ruptures and delaminates from the adjacent delamination layer. Sealant residue is deposited on the surface of the container and the surface of the delamination layer is exposed. When a pressure sensitive adhesive (PSA) layer is used as the delamination layer, resealability can be obtained by exposing the tacky surface of the PSA layer.

Conventional reclose systems are limited in availability and have shortcomings such as excessive fabrication steps and poor processability. Conventional reclose systems are typically coated water-based acrylics and require lamination, die-cutting, and other secondary processing steps. Hot melt adhesives based on styrenic block copolymers (SBC) eliminate some processing steps but are difficult to process and are not approved for direct food contact.

A need exists for an adhesive composition with reclosability that is safe for food contact (food-safe). A need further exists for a pressure sensitive adhesive (PSA) composition that is food-safe, reclosable, and extrudable for PSA film production.

SUMMARY

The present disclosure provides an adhesive composition and a PSA formulation in particular. The present composition can be formed as a film (or a film layer) and sealed using traditional means, yet advantageously exhibits a controlled cohesive failure that exposes the PSA layer. The film can be used for packaging products and can be made into a package on typical film converting equipment such as, but not limited to, a vertical form-fill-seal line (VFFS).

The present disclosure provides a composition. In an embodiment, the composition includes:

A) an ethylene/α-olefin multi-block copolymer having a melt index from 0.2 g/10 min to 8.0 g/10 min;
B) a styrenic block polymer comprising from greater than 1 wt % to less than 50 wt % units of polymerized styrene;
C) a tackifier;
D) an oil; and
the composition has a melt index from 3 g/10 min to 50 g/10 min.

The present disclosure provides an article. In an embodiment, the article is a multilayer flexible film. The present composition is a pressure sensitive adhesive layer in the multilayer flexible film. In a further embodiment, the multilayer flexible film is a component of a packaging structure and the pressure sensitive adhesive layer, composed of the present composition, is reclosable, to produce a reclosable packaging structure.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1, or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 230° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same type or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer. It is understood that trace amounts of impurities, such as catalyst residues, can be incorporated into the polymer structure.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a composition. In an embodiment, the composition includes:

A) an ethylene/α-olefin multi-block copolymer having a melt index from 0.2 g/10 min to 8.0 g/10 min;

B) a styrenic block polymer comprising from greater than 1 wt % to less than 50 wt % units of polymerized styrene;

C) a tackifier;

D) an oil; and the composition has a melt index (12; 190° C.) from 3 to 50 g/10 min.

1. Ethylene/α-Olefin Multi-Block Copolymer

The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol %, or 65 mol % to 80 mol %. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In an embodiment, the ethylene multi-block copolymer is defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g } \Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; and/or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30 carbon atoms, or 4 to 20 carbon atoms, or 4 to 12 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 4 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8α-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the present ethylene/α-olefin multi-block copolymer includes ethylene and an α-olefin comonomer with 4, or 6, or 8, to 10, or 12 carbon atoms.

The ethylene/α-olefin multi-block copolymer can be produced via a chain shuttling polymerization process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In an embodiment, the ethylene/α-olefin multi-block copolymer has hard segments and soft segments and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 0.1 g/10 min, or 0.5 g/10 min, or 1 g/10 min, or 1.5 g/10 min to 2.0 g/min, or 2.5 g/10 min, or 3.0 g/10 min, or 4.9 g/10 min to 5.0 g/10 in, or 6.0 g/10 min, or 7.0 g/10 min, or 8.0 g/10 min;

(vii) a Shore A hardness from 65, or 70, or 71, or 72 to 73, or 74, or 75, or 77, or 79, of 80;

(viii) an elastic recovery (Re) from 50%, or 60% to 70%, or 80%, or 90%, at 300% 300% min$^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer.

In an embodiment, the ethylene/α-olefin multi-block copolymer is an ethylene/octene multi-block copolymer having a density from 0.860 g/cc to 0.870 g/cc, and a melt index from 0.1 g/10 min, or 0.5 g/10 min to 1.0 g/10 min, or 1.5 g/10 min, or 3.0 g/10 min.

In an embodiment, the ethylene/octene multi-block copolymer is sold under the Tradename INFUSE™ is available from The Dow Chemical Company, Midland, Mich., USA.

In an embodiment, the ethylene/octene multi-block copolymer is INFUSE™ 9107.

The present ethylene/α-olefin multi-block copolymer may comprise two or more embodiments disclosed herein.

2. Styrenic-Based Block Polymer

The present composition includes a styrenic block polymer. The styrenic block polymer contains from greater than 1 wt % to less than 50 wt % of polymerized styrene, or from 10 wt % polymerized styrene to less than 50 wt % polymerized styrene. Nonlimiting examples of suitable styrenic-based block polymers include styrene-isoprene-styrene block copolymers (SIS), styrene-butadiene-styrene block copolymers (SBS), styrene-ethylene/butylene-styrene block copolymers (SEBS), styrene-isobutylene-styrene block copolymers (SIBS), styrene-ethylene-propylene-styrene block copolymers (SEPS), and mixtures thereof. Nonlimiting examples of suitable styrenic-based materials include materials commercially available under the tradename "KRATON" such as KRATON D1161, KRATON D1118, KRATON G1657, and the like, available from Kraton Corp., Houston, Tex. or materials commercially available under the trade name "Vector" such as 4113A, 4114A, 4213A, and the like, available from Dexco Polymers, Houston, Tex.

In an embodiment, the styrenic-based block polymer contains from 10 wt %, or 15 wt %, or 16 wt %, or 18 wt % to 20 wt %, or 25 wt %, or 30 wt %, or 35 wt %, or 40 wt %, or 45 wt % polymerized styrene.

In an embodiment, the styrenic-based block polymer is an SIS and contains from 15 wt %, or 20 wt % to 25 wt % polymerized styrene.

The present styrenic-based block polymer may comprise two or more embodiments discussed herein.

3. Tackifier

The present composition includes a tackifier. Typically, a tackifier is a resin that is used to reduce modulus and improve surface adhesion.

In an embodiment, the tackifier may be a non-hydrogenated aliphatic $C_5$ (five carbon atoms) resin, a hydrogenated aliphatic $C_5$ resin, an aromatic modified $C_5$ resin, a terpene resin, a hydrogenated $C_9$ resin, or combinations thereof.

In an embodiment, the tackifier has a density from 0.92 g/cc to 1.06 g/cc.

In an embodiment, the tackifier has a Ring and Ball softening temperature (measured in accordance with ASTM E 28) from 80° C. to 140° C., or from 85° C. to 130° C., or from 90° C. to 120° C., or from 90° C. to 110° C., or from 91° to 100° C.

In an embodiment, the tackifier has a melt viscosity less than 1000 Pascal second (Pa·s) at 175° C. In a further embodiment, the tackifier has a melt viscosity greater than, or equal to, 1 Pascal second (Pa·s) at 175° C., further greater than, or equal to, 5 Pascal second (Pa·s) at 175° C.

In an embodiment, the tackifier has a melt viscosity less than 500 Pa·s at 175° C., or less than 200 Pa·s at 175° C., or less than 100 Pass at 175° C., or less than 50 Pa·s at 175° C. In a further embodiment, the tackifier has a melt viscosity from 1 Pa·s to less than 100 Pa·s, or to less than 50 Pa·s at 175° C. Tackifier melt viscosity is determined in accordance with DMS.

The $C_5$ resin for a "$C_5$ tackifier" may be obtained from $C_5$ feedstocks such as pentenes and piperylene. The terpene resin for a tackifier may be based on pinene and d-limonene feedstocks.

Nonlimiting examples of suitable tackifier include tackifiers sold under the tradename PICCOTAC, REGALITE, REGALREZ, and PICCOLYTE, such as PICCOTAC 1100, PICCOTAC 1095, REGALITE R1090, REGALREZ 11126, available from The Eastman Chemical Company, and PICCOLYTE F-105 from PINOVA.

The tackifier may comprise a combination or two or more embodiments described herein.

4. Oil

The present composition includes an oil. In an embodiment, the oil contains greater than 95 mole % aliphatic carbons. In an embodiment, the glass transition temperature for the amorphous portion of the oil is typically below −70° C. The oil can be a mineral oil. Nonlimiting examples of suitable oil include mineral oil sold under the tradenames HYDROBRITE 550 (Sonneborn), PARALUX 6001 (Chevron), KAYDOL (Sonneborn), BRITOL 50T (Sonneborn), CLARION 200 (Citgo), and CLARION 500 (Citgo). The oil may comprise a combination or two or more embodiments described herein.

5. Additive

The present composition may include one or more additives. Additives include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof. In an embodiment, the present composition further comprises one or more additional polymers. Additional polymers include, but are not limited to, ethylene-based polymers and propylene-based polymers.

6. Adhesive Composition

In an embodiment, the present composition is an adhesive composition. The adhesive composition is composition (1) and includes:

A) from 30 wt % to 65 wt % of the ethylene/α-olefin multi-block copolymer;
B) from 10 wt % to 35 wt % of the styrenic block polymer;
C) from 20 wt % to 40 wt % of the tackifier; and
D) from greater than 0 wt % to 8 wt % of the oil.

In an embodiment, the adhesive composition is composition (2) and includes:

A) from 33 wt % to 55 wt % of the ethylene/α-olefin multi-block copolymer;
B) from 10 wt % to 30 wt % of the styrenic block polymer;
C) from 25 wt % to 30 wt % of the tackifier; and
D) from 5 wt % to 7 wt % of the oil.

The ethylene/α-olefin multi-block copolymer, styrenic block polymer, tackifier, and oil for composition (1) and for composition (2) may be any respective ethylene/α-olefin multi-block copolymer, styrenic block polymer, tackifier, and oil disclosed herein.

In an embodiment, each of composition (1) and composition (2) exhibit one, some, any combination of, or all of the following features:

(i) the composition has a melt index (I2; 190° C.) from 3, or 5, or 10, or 15, or 20, or 25 to 30, or 35, or 40, or 45, or 50 g/10 min;
(ii) a density from 0.890, or 0.90, or 0.91 to 0.92, or 0.93 g/cc;
(iii) a reclose peel adhesion force greater than 0.7 N/25 mm, or 1.0 N/25 mm, or 3.0 N/25 mm, or 5.0 N/25 mm to 7.0 N/25 mm, or 9.0 N/25 mm, or less than 10 N/25 mm after 10 reclose cycles (PSTC-101, modified method A; N/25 mm, 23° C./50% RH);
(iv) a glass transition temperature (Tg) from −58° C., −56° C., or −54° C., or −53° C., or −51° C., or −50° C. to −48° C., or −45° C., or −40° C., or from −58° C. to −40° C.;
(v) a melting temperature (Tm) from 115° C., or 116° C., or 117° C., or 118° C., or 119° C. to 120° C., or 123° C., or 125° C.; or from 115° C. to 125° C.;
(vi) a crystallization temperature (Tc) from 100° C., or 102° C., or 103° C., or 104° C. to 105° C., or 107° C., or 109° C., or 111° C., or 113° C., or 115° C.; or from 100° C. to 115° C.;
(vii) an $I_{10}/I_2$ from 12, or 14, or 16, or 17, or 18 to 19, or 21, or 23, or 25; or from 12 to 25;
(viii) a dynamic melt viscosity from $5.0\times10^5$ mP-s, or $1.0\times10^6$, or $1.2\times10^6$, or $1.5\times10^6$, or $2.0\times10^6$, or $3.0\times10^6$, or $4.0\times10^6$ to $5.0\times10^6$, or $6.0\times10^6$, or $7.0\times10^6$, or $8.0.10^6$, mP-s at 190° C. and 1 Hz frequency measured by Dynamic Mechanical Spectroscopy.

In an embodiment, the weight ratio of the ethylene/α-olefin multi-block copolymer (Component A) to the styrenic block polymer (Component B) in each of composition (1) and composition (2) is from 1.0 to 10.0, or from 1.0 to 9.0, or from 1.0 to 8.0, or from 1.0 to 7.0, or from 1.0 to 6.0.

In an embodiment, the weight ratio of the ethylene/α-olefin multi-block copolymer (Component A) to the styrenic block polymer (Component B) in each of composition (1) and composition (2) is from 1.1 to 10.0, or from 1.1 to 9.0, or from 1.1 to 8.0, or from 1.1 to 7.0, or from 1.1 to 6.0.

In an embodiment, the weight ratio of the ethylene/α-olefin multi-block copolymer (Component A) to the tackifier (Component C) in each of composition (1) and composition (2) is from 1.0 to 2.0, or from 1.0 to 1.9, or from 1.0 to 1.8.

In an embodiment, the weight ratio of the ethylene/α-olefin multi-block copolymer (Component A) to the tackifier (Component C) in each of composition (1) and composition (2) is from 1.1 to 2.0, or from 1.1 to 1.9, or from 1.1 to 1.8.

In an embodiment, the weight ratio of the tackifier (Component C) to the styrenic block polymer (Component B) in each of composition (1) and composition (2) is from 1.0 to 4.0, or from 1.0 to 3.5, or from 1.0 to 3.0.

In an embodiment, the combined weight of the ethylene/α-olefin multi-block copolymer (Component A) and the styrenic block polymer (Component B) comprise greater than, or equal to, (≥) 50 wt %, or ≥55 wt %, or ≥60 wt % of the total weight of each of composition (1) and composition (2).

In an embodiment, each of composition (1) and composition (2) comprises greater than, or equal to, (≥) 80 wt %, or ≥85 wt %, or ≥90 wt %, or ≥95 wt %, or ≥98 wt %, or ≥99 wt %, of the sum of the weights of Components A (ethylene/α-olefin multi-block copolymer), B (styrenic block polymer), C (tackifier), and D (oil), based on the weight of the composition.

Test Methods

Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 230° C. and held isothermal for 5 minutes in order to remove its thermal history. Next, the sample is cooled to −90° C. at a 10° C./minute cooling rate and held isothermal at −90° C. for 5 minutes. The sample is then heated to 230° C. (this is the "second heat" ramp) at a 10° C./minute heating rate. The cooling and second heating curves are recorded. The values determined are extrapolated onset of melting, Tm, and extrapolated onset of crystallization, Tc. Heat of fusion (H$_f$) (in Joules per gram), and the calculated % crystallinity for polyethylene samples using the Equation below:

$$\% \text{ Crystallinity} = ((H_f)/292 \text{ J/g}) \times 100$$

The heat of fusion (H$_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in B. Wunderlich in *Thermal Characterization of Polymeric Materials*, 2$^{nd}$ edition, Academic Press, 1997, E. Turi ed., pgs 277 and 278.

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature; Tg, is determined from the DSC heating curve where half the sample has gained the liquid heat capacity as described in B. Wunderlich in *Thermal Characterization of Polymeric Materials*, 2$^{nd}$ edition, Academic Press, 1997, E. Turi ed., pg 278 and 279. Baselines are drawn from below and above the glass transition region and extrapolated through the Tg region. The temperature at which the sample heat capacity is half-way between these baselines is the Tg.

DMS (Polymers and Formulations)

Dynamic Mechanical Spectroscopy (DMS) is measured on compression molded disks formed in a hot press at 180° C. at 10 MPa pressure for 5 minutes, and then water cooled in the press at 90° C./min. Testing is conducted using an ARES controlled strain rheometer (TA instruments) equipped with dual cantilever fixtures for torsion testing.

For polymer testing, a 1.5 mm plaque is pressed, and cut in a bar of dimensions 32×12 mm (test sample). The test sample is clamped at both ends between fixtures separated by 10 mm (grip separation ΔL), and subjected to successive temperature steps from −100° C. to 200° C. (5° C. per step). At each temperature, the torsion modulus G' is measured at an angular frequency of 10 rad/s, the strain amplitude being maintained between 0.1 percent and 4 percent, to ensure that the torque is sufficient and that the measurement remained in the linear regime.

An initial static force of 10 g is maintained (auto-tension mode) to prevent slack in the sample when thermal expansion occurred. As a consequence, the grip separation ΔL increases with the temperature, particularly above the melting or softening point of the polymer sample. The test stops at the maximum temperature or when the gap between the fixtures reaches 65 mm.

For PSA formulation testing, constant temperature frequency sweeps using a TA Instruments Advance Rheometric Expansion System (ARES) equipped with 8 mm parallel plates geometry under a nitrogen purge. Frequency sweeps are performed at 150° C. and 190° C. for all the samples at a gap of 2.0 mm and at a constant strain of 10%. The frequency interval is 0.1 to 100 radians/seconds. The stress response is analyzed in terms of amplitude and phase, from which the storage modulus (G'), loss modulus (G") and dynamic melt viscosity (eta*, or η*) are calculated.

Constant frequency temperature sweeps are performed using a TA Instruments Advance Rheometric Expansion System (ARES) equipped with 8 mm parallel plates geometry under a nitrogen purge. Temperature sweeps are performed at 1 Hz frequency, from −40° C. to 200° C. for all the samples at a gap of 2.0 mm and at a constant strain of 10%. The frequency interval is 0.1 to 100 radians/seconds. The stress response is analyzed in terms of amplitude and phase, from which the storage modulus (G'), loss modulus (G") and dynamic melt viscosity (eta*, or η*) are calculated.

GPC Method

For polymer testing the Gel Permeation Chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume is 100 microliters and the flow rate is 1.0 ml/minute.

Calibration of the GPC column set is performed with 21 narrow molecular weight distribution polystyrene standards with molecular weights ranging from 580 to 8,400,000 g/mole, arranged in six "cocktail" mixtures, with at least a decade of separation between individual molecular weights. The standards are purchased from Polymer Laboratories (Shropshire, UK). The polystyrene standards are prepared at "0.025 grams in 50 milliliters of solvent" for molecular weights equal to, or greater than, 1,000,000 g/mole, and "0.05 grams in 50 milliliters of solvent" for molecular weights less than 1,000,000 g/mole. The polystyrene standards are dissolved at 80° C. with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621(1968)): $M_{polyethylene} = 0.431(M_{polystyrene})$. Polyethylene equivalent molecular weight calculations are performed using VISCOTEK TriSEC software Version 3.0.

For PSA formulation testing, a PolymerChar (Valencia, Spain) high temperature Gel Permeation Chromatography (GPC) system is utilized and consists of an Infra-red detector (IR5). The carrier solvent is 1,2,4-trichlorobenzene (TCB). The pump and the on-line solvent degas device are from Agilent. The auto-sampler and column oven are from Agilent. The auto-sampler compartment is operated at 160° C., and the column compartment is operated at 150° C. The columns are three Mixed B 10 μm columns. The chromatographic solvent (TCB) and the sample preparation solvent contained 200 ppm of butylated hydroxytoluene (BHT) and both solvent sources are nitrogen purged. The same solution is made either in a 2 oz bottle, transferred into the sample vial and reheated for at least 30 min in the auto-sampler prior to injection, or is directly made using the autosampler. The injection volume is 200 μl, and the flow rate is 1.0 ml/minute.

All the products and their raw materials (resin, tackifier, oil, and polywax) are run back-to-back on the same instrument to minimize possible variations of instrumentation.

Reclose Packaging Adhesion Test

The samples are fabricated using the LABTECH 5-Layer Blown Film Line. Samples are then adhesively laminated on a Labo Combi Solventless Laminator to a "48 ga biaxially oriented polyethylene terephthalate (PET; available from DuPont Teijin)" using MORFREE 403A (solventless adhesive, available from The Dow Chemical Company) and co-reactant C411 (solvent-less adhesive; available from the Dow Chemical Company), to form a final laminate film structure (sealant/PSA/core (3 layers)/solventless adhesive/PET). Here, the test samples are cut to "300 mm long by 25 mm wide" strips of laminated film, folded in half (sealant layer to sealant layer) and sealed 25 mm from the fold. Each laminate film structure is sealed with "sealant side to sealant side" using a W. Kopp Verpackungsmachinen Model D73732 with 5 mm wide seal bars, 0.5 second dwell time, 60 N/cm$^2$ pressure is used to make the seal and the seal is initiated at the temperature indicated with the test results shown in Table 5. The sealed samples are cut to dimensions "25 mm×150 mm" with the seal perpendicular to the long axis to form a test specimen. The final seal size or area to perform the opening and closing mechanism is "25 mm by 5 mm."

The adhesion test follows the general framework of PSTC-101 test method A from the Pressure Sensitive Tape Council (PSTC). This is a 180° angle peel, at 305 mm/minute, against some surface of interest. In this case, the film layer adjacent to the adhesive layer, where reclose functionality is designed to exist, is the surface of interest. Flexible film samples are fixed to a stainless steel panel using masking tape [PET/solventless adhesive/core (3 layers)/PSA/sealant/sealant/PSA/core (3 layers)/solventless adhesive/PET/fixed to panel with masking tape at one free end (sealant/PSA/core (3 layers)/solventless adhesive/PET) of the test specimen; the adhesive on the masking tape is in contact with the sealant layer of the free end of the test specimen]. A second piece of masking tape is used to fix the folded end of the test specimen to the panel; here, the tape is placed approximately 10 mm from the fold [masking tape/PET/solventless adhesive/core (3 layers)/PSA/sealant/sealant/PSA/core (3 layers)/solventless adhesive/PET/fixed to panel with masking tape; the adhesive on the masking tape is in contact with the upper PET layer of the folded end of the test specimen.] The other free end of the test specimen is peeled at 180° from the fixed free end of the test specimen, causing a break within the PSA for Examples 1-5 and at the PSA—core interface for Comparative Examples 1 and 2 [Free end: PET/solventless adhesive/core (3 layers)/-BREAK—PSA/sealant/sealant/PSA/core (3 layers)/solventless adhesive/PET-panel], and giving a force value.

An INSTRON 5564, running BLUEHILL 3 software, is used to collect the peel data. All samples are equilibrated to standard conditions, 23° C. and 50% RH. Testing is conducted in standard conditions as well. The peak force is recorded for five test samples of each laminated film, and averaged. After the first peel, the specimen is reclosed using the standard roller conditions given in the PSTC test method for sample lamination. The standard dwell time between rolling/sealing the specimen and testing/peeling the specimen is 20 minutes, but several longer dwells are performed to test the PSA's recovery and are indicated in Table 5 (23° C. and 50% RH). The specimen is reclosed 10 times or until the force could no longer be measured. The adhesion results are shown in Table 5. The PSA failure modes are recorded as "C" meaning cohesive failure through PSA layer and "A" meaning adhesive delamination between PSA and adjacent layer.

By way of example, and not limitation, examples of the present disclosure are provided.

EXAMPLES

1. Materials

Materials used in the examples are provided in Table 1 below.

TABLE 1

| Material | Description & Characteristics |
| --- | --- |
| INFUSE 9107 | Ethylene/α-olefin interpolymer, with density of 0.866 g/cm$^3$ and melt index I2 of 1.0 g/10 min (190° C./2.16 kg). |
| INFUSE 9507 | Ethylene/α-olefin interpolymer, with density of 0.866 g/cm$^3$ and melt index I2 of 5.0 g/10 min (190° C./2.16 kg). |
| Piccotac 1100 | C5 tackifier - Ring and ball softening point of 100° C. Mw of 2900, available from Eastman Chemical Company. |
| Piccotac 1095 | C5 Tackifier - Ring and ball softening point of 94° C. and M$_w$ of 1700, available from Eastman Chemical Company. |
| Hydrobrite 550 | Clear mineral oil - Density of ~0.87 g/cm$^3$ and Paraffinic carbon of ~70%. |
| Chevron Paralux 6001 | Paraffinic process oil - Density of ~0.87 g/cm$^3$ and Paraffinic carbon of ~70%. |
| Vector 4114A | Styrene Isoprene triblock copolymer with a polystyrene content of 16%, diblock content of 42%, density of 0.92, melt index of 25 g/10 min (200° C./5 kg) |
| Vector 4113A | Styrene Isoprene triblock copolymer with a polystyrene content of 18%, diblock content of 42%, density of 0.92, melt index of 11 g/10 min (200° C./5 kg) |
| Vector 4213A | Styrene Isoprene triblock copolymer with a polystyrene content of 25%, diblock content of 25%, density of 0.94, melt index of 12 g/10 min (200° C./5 kg) |

TABLE 1-continued

| Material | Description & Characteristics |
|---|---|
| DOW LDPE 5004I | Low Density Polyethylene - Density of 0.924 g/cm³ and I2 of 4.2 g/10 min (190° C./2.16 kg) |
| DOWLEX 2038.68G Polyethylene Resin | Density of 0.935 g/cm³ and I2 of 1 g/10 min (190° C./2.16 kg) |
| BRASKEM PP 6D83K | Random Copolymer Polypropylene - MFR of 1.9 g/10 min (230° C./2.16 kg) |
| DOW DFDA-7059 NT 7 | Linear Low Density Polyethylene Resin-Density of 0.918 g/cm³ and I2 of 2 g/10 min (190° C./2.16 kg) |
| AMPACET 10063 - Antiblock masterbatch | Available from Ampacet |
| AMPACET 10090 - Slip masterbatch | Available from Ampacet |

2. Sample Preparation

Adhesive formulations are prepared using a twin screw extruder, and then tested for melt index and density (Table 2). The formulations shown in Table 2 are prepared by a single step twin screw extrusion process. The formulation components, in wt %, are listed in Table 2. The compounding operation is performed on a COPERION ZSK-25 25 mm co-rotating twin screw extruder. The extruder has a total length-to-diameter ratio (L/D) of 48. The extruder is equipped with a 24 kW motor and a maximum screw speed of 1200 rpm. The feed system for this extrusion line consists of two loss-in-weight feeders. The polymer precursor(s) is fed into the main feed throat of the extruder using a K-Tron KCLQX3 single-screw feeder. PICCOTAC tackifier is fed into the side arm at barrel 5. The HYDROBRITE 550 process oil is added through an injection port at barrel 4 using a Leistritz Gear Pump. The compound is pelletized using an underwater pelletization unit with a 2-hole die. The pellets are collected and dusted with 2000 ppm POLYWAX 2000 (available from Baker Hughes), and then dried under nitrogen purge for 24 hours. Screw speed is set at 300 RPM for all the samples. Temperature profile is set as follows: 100° C. (zone 1), 120° C. (zone 2), 140° C. (zone 3), 140° C. (zone 4), 110° C. (zone 5), 100° C. (zone 6), 110° C. (zone 7).

TABLE 2

Example and comparative formulations based on weight percent

| Ex. | Infuse 9107 | Infuse 9507 | Vector 4113A | Vector 4114A | Vector 4213A | Piccotac 1100 | Hydrobrite 550 | d Density | $I_2$ | $I_{10}$ |
|---|---|---|---|---|---|---|---|---|---|---|
| Ex1 | 53.4 | | | 10 | | 30 | 6.6 | 0.903 | 8.6 | 125.1 |
| Ex2 | 43.4 | | | 20 | | 30 | 6.6 | 0.909 | 15.4 | 264.6 |
| Ex3 | 43.4 | | 20 | | | 30 | 6.6 | 0.908 | 28.4 | 409.5 |
| Ex4 | 33.4 | | 30 | | | 30 | 6.6 | 0.915 | 10.6 | 203.3 |
| Ex5 | 33.4 | | | | 30 | 30 | 6.6 | 0.917 | 16.1 | 235.6 |
| CS1 | | | | | 63.4 | 30 | 6.6 | 0.942 | 13.7 | 294.2 |
| CS2 | | 74.1 | | | | 19.3 | 6.6** | 0.884 | 13.7 | 128.4 |

Example and comparative formulations based on weight percent

| Ex. | $I_{10}/I_2$ | Tc | ΔH cryst | Tg | Tm | ΔH melt | G'* | η @ 150 ° C. (mPa-s)* | η @ 190 ° C. (mPA-s)* |
|---|---|---|---|---|---|---|---|---|---|
| Ex1 | 14.7 | 102.9 | 23.07 | −52.7 | 118.59 | 24.33 | $1.7 \times 10^7$ | $4.0 \times 10^6$ | $1.6 \times 10^6$ |
| Ex2 | 17.2 | 103.9 | 18.30 | −52.8 | 119.19 | 16.26 | $1.3 \times 10^7$ | $3.2 \times 10^6$ | $1.2 \times 10^6$ |
| Ex3 | 14.4 | 103.8 | 19.40 | −51.5 | 119.25 | 17.43 | $8.5 \times 10^6$ | $3.3 \times 10^6$ | $1.2 \times 10^6$ |
| Ex4 | 19.2 | 103.5 | 18.41 | −54.7 | 119.0 | 13.91 | $3.8 \times 10^6$ | $3.1 \times 10^6$ | $7.5 \times 10^6$ |
| Ex5 | 14.6 | 102.2 | 16.61 | −52.5 | 118.7 | 12.58 | $7.5 \times 10^6$ | $4.9 \times 10^6$ | $1.8 \times 10^6$ |
| CS1 | 21.5 | 101.7 | 1.48 | −53.1 | 113.7 | 1.22 | $1.3 \times 10^6$ | $6.3 \times 10^6$ | $4.2 \times 10^6$ |
| CS2 | 9.4 | 110 | 23 | −55 | 121 | 22 | $1.3 \times 10^7$ | | |

*from DMS data
**for CS2, use PICCOTAC 1095 tackifier and PARALUX 6001 oil
CS—comparative sample
d—density The formulation of Example 4, shown in Tables 1 and 2, is used to make a five layer films, on a blown film line, to form an embedded PSA, within a flexible package, and to enable a good reclose feature. Blown extrusion samples are fabricated using a LABTECH 5-layer blown film line. The heat seal layer is positioned on the outside of the bubble, and the material is self-wound on uptake rollers. Film fabrication conditions are shown in Table 3. Film configurations, and the polymer formulation (wt % of each component) used to form each film layer, are listed in Tables 4 and 5.

TABLE 3

Film Fabrication Conditions

| Structure | S1 | S2 | S3 | S4 | S5 | S-CS1* | S-CS2* |
|---|---|---|---|---|---|---|---|
| Output (kg/hr) | 17.3 | 17.3 | 17.3 | 17.3 | 17.3 | 17.3 | 17.3 |
| Gauge (micron) | 76.2 | 76.2 | 76.2 | 76.2 | 76.2 | 76.2 | 76.2 |
| Layflat (cm) | 33.0 | 33.0 | 33.0 | 33.0 | 33.0 | 33.0 | 35.6 |
| Line Speed (m/min) | 5.1 | 5.0 | 5.0 | 5.0 | 5.0 | 5.0 | 4.7 |
| Blower Speed (rpm) | 1652 | 1652 | 1522 | 1522 | 2116 | 1959 | 1739 |
| Screw Speed (rpm) | | | | | | | |
| Extruder 1 | 100 | 98 | 100 | 100 | 96 | 98 | 41 |
| Extruder 2 | 93 | 93 | 92 | 92 | 90 | 89 | 147 |
| Extruder 3 | 67 | 67 | 66 | 66 | 66 | 66 | 89 |
| Extruder 4 | 134 | 129 | 132 | 133 | 133 | 134 | 79 |
| Extruder 5 | 27 | 27 | 27 | 26 | 27 | 27 | 212 |
| Melt Temp (° C.) | | | | | | | |
| Extruder 1 | 207 | 207 | 207 | 207 | 207 | 207 | 212 |
| Extruder 2 | 161 | 161 | 152 | 152 | 152 | 142 | 159 |
| Extruder 3 | 218 | 218 | 218 | 218 | 218 | 218 | 216 |
| Extruder 4 | 214 | 214 | 214 | 214 | 214 | 214 | 218 |
| Extruder 5 | 211 | 211 | 211 | 211 | 211 | 211 | 207 |
| Melt Pressure (MPa) | | | | | | | |
| Extruder 1 | 6 | 6 | 6 | 6 | 6 | 6 | 6 |
| Extruder 2 | 7 | 5 | 7 | 7 | 8 | 7 | 7 |
| Extruder 3 | 22 | 22 | 23 | 23 | 23 | 24 | 19 |
| Extruder 4 | 30 | 31 | 31 | 31 | 30 | 32 | 24 |
| Extruder 5 | 21 | 21 | 21 | 21 | 21 | 21 | 23 |

*Comparative Sample

TABLE 4

Five Layer Blown Film Structures

| Structure | S1 | S2 | S3 | S4 | S5 | S-CS1* | S-CS2* |
|---|---|---|---|---|---|---|---|
| Gauge (mil) | 3 | 3 | 3 | 3 | 3 | 3 | 3 |
| Layer ratio (%) | 10/20/20/20/30 | 10/20/20/20/30 | 10/20/20/20/30 | 10/20/20/20/30 | 10/20/20/20/30 | 10/20/20/20/30 | 10/20/20/20/30 |
| Layer 1 (sealant) | 99.84% LDPE 5004 + 1% AMPACET 10063 + 0.6% AMPACET 10090 | 99.84% LDPE 5004 + 1% AMPACET 10063 + 0.6% AMPACET 10090 | 99.84% LDPE 5004 + 1% AMPACET 10063 + 0.6% AMPACET 10090 | 99.84% LDPE 5004 + 1% AMPACET 10063 + 0.6% AMPACET 10090 | 99.84% LDPE 5004 + 1% AMPACET 10063 + 0.6% AMPACET 10090 | 99.84% LDPE 5004 + 1% AMPACET 10063 + 0.6% AMPACET 10090 | 99.84% LDPE 5004 + 1% AMPACET 10063 + 0.6% AMPACET 10090 |
| Layer 2 (PSA) | Ex. 1 | Ex. 2 | Ex. 3 | Ex. 4 | Ex. 5 | CS1 | CS2 |
| Layer 3 (core) | 100% DOWLEX 2038.68G | 100% DOWLEX 2038.68G | 100% DOWLEX 2038.68G | 100% DOWLEX 2038.68G | 100% DOWLEX 2038.68G | 100% DOWLEX 2038.68G | 100% BRASKEM 6D83K |
| Layer 4 (core) | 100% DOWLEX 2038.68G | 100% DOWLEX 2038.68G | 100% DOWLEX 2038.68G | 100% DOWLEX 2038.68G | 100% DOWLEX 2038.68G | 100% DOWLEX 2038.68G | 100% BRASKEM 6D83K |
| Layer 5 (core) | 100% DOWLEX 2038.68G | 100% DOWLEX 2038.68G | 100% DOWLEX 2038.68G | 100% DOWLEX 2038.68G | 100% DOWLEX 2038.68G | 100% DOWLEX 2038.68G | 100% BRASKEM 6D83K |

*Comparative Sample

The present films of Tables 4 and 5 are of good integrity. These multilayered films are flexible films, formed from only coextrudable polymer formulations. These films can be used for packaging products, and can be processed on typical film converting equipment.

Certain films are adhesively laminated to a "48 ga biaxially oriented polyethylene terephthalate (available from DuPont Teijin)" using MORFREE 403A (solventless adhesive, available from The Dow Chemical Company) and co-reactant C411 (solvent-less adhesive; available from the Dow Chemical Company), to form a final laminate film structure (sealant/PSA/core (3 layers)/solventless adhesive/PET).

The reclose adhesion results on the laminated film structures are shown in Table 5 following the "Reclose Packaging Adhesion Test." As seen in Table 5, the present films have excellent reclose adhesion. By positioning the extrudable PSAs as the second layer in the structure, between the heat sealant and the core (or backing) materials a structure is formed that could be opened and closed multiple times. The remainder of the core structure can be a LLDPE/LDPE blend. As discussed above, the five layer film is laminated to PET to simulate a typical package structure. The peel values stabilized and remained consistent for up to 10 open close cycles.

The advantages of the present composition are evident when comparing Examples 1-5 versus Comparative Samples 1 and 2. The preferred opening mechanism in reclosable packaging is a cohesive failure which reduces the PSA adhesion performance dependence on adjacent layers. An adhesive failure delamination mechanism's adhesion performance is partially related to the adjacent layer. This dependence can be seen by comparing Structure Examples 1 and 7 in WO2014172178.

The processing of Comparative Sample 1 is significantly more difficult than the processing for Examples 1-5 when trying to make a multilayer blown film structure. As seen in Table 3 the melt temperature for Comparative Sample 1 is 10° C. lower than the melt temperature for Examples 3-5 in order to maintain the bubble on the blown film line. The extruder temperature set points are 121° C. (Zone 1), 127° C. (Zone 2), and 138° C. (Zone 3) for Comparative Sample 1 which are low and make for difficult control system compared to when extruding other common polyolefins like LDPE, LLDPE, or rcPP in adjacent layers.

Comparative Sample 2 shows the decreased adhesion performance found across the 10 reclose cycles when a styrenic-based copolymer is not included in the Example (as in Examples 1-5). This significantly improved adhesion performance is necessary in demanding applications where a small seal adhesion area is required to contain a large load within the package.

The results for reclose adhesion testing are shown in Table 5 below. Adhesion values are N/25 mm. Table 5 shows Examples 1-5 each exhibit cohesive failure through the PSA layer. Comparative Sample 1 and Comparative Sample 2 each exhibit adhesive delamination between the PSA layer and the adjacent layer.

TABLE 5

Reclose adhesion testing for example and comparative formulations

| Seal Temperature (° C.) | PSA Failure Mode | Sample Dwell Times | | | | | | | | | |
|---|---|---|---|---|---|---|---|---|---|---|---|
| | | 20 min | 20 min | 20 min | 20 min | 20 min | 50 min | 20 min | 20 min | 90 min | 20 min |
| Example 1 | | | | | | | | | | | |
| 130 | C | 5.6 | 4.1 | 3.2 | 2.4 | 2.3 | 1.8 | 1.8 | 2.0 | 1.8 | 1.6 |
| 140 | C | 8.0 | 5.3 | 4.7 | 3.6 | 4.0 | 3.1 | 3.1 | 3.0 | 3.0 | 2.4 |
| 150 | C | 6.1 | 4.4 | 4.2 | 3.6 | 2.8 | 2.7 | 2.7 | 2.5 | 2.0 | 1.7 |
| Example 2 | | | | | | | | | | | |
| 130 | C | 4.5 | 2.9 | 2.2 | 2.2 | 2.2 | 1.5 | 1.4 | 1.3 | 1.3 | 1.4 |
| 140 | C | 6.3 | 3.7 | 2.9 | 2.6 | 2.3 | 2.2 | 2.0 | 1.6 | 2.0 | 1.7 |
| 150 | C | 5.9 | 3.5 | 3.1 | 2.4 | 2.1 | 2.8 | 1.5 | 1.3 | 1.5 | 1.1 |
| Example 3 | | | | | | | | | | | |
| 130 | C | 7.3 | 5.3 | 4.2 | 3.5 | 3.1 | 2.6 | 2.2 | 2.2 | 2.0 | 2.0 |
| 140 | C | 5.1 | 3.9 | 3.2 | 2.9 | 2.7 | 2.3 | 2.2 | 1.7 | 2.0 | 2.1 |
| 150 | C | 7.3 | 5.3 | 4.5 | 4.2 | 4.1 | 3.9 | 3.7 | 2.6 | 2.2 | 2.9 |
| Example 4 | | | | | | | | | | | |
| 130 | C | 4.6 | 3.8 | 3.3 | 2.5 | 2.2 | 2.4 | 2.1 | 1.9 | 1.6 | 2.0 |
| 140 | C | 3.9 | 2.9 | 2.0 | 1.8 | 1.8 | 1.4 | 1.4 | 1.3 | 1.4 | 1.6 |
| 150 | C | 3.2 | 2.0 | 1.5 | 1.1 | 1.0 | 1.0 | 0.9 | 0.8 | 0.7 | 0.7 |
| Example 5 | | | | | | | | | | | |
| 130 | C | 4.0 | 2.7 | 2.1 | 1.8 | 1.6 | 1.3 | 1.2 | 1.1 | 1.1 | 1.1 |
| 140 | C | 4.4 | 3.3 | 2.4 | 2.1 | 1.7 | 2.0 | 1.8 | 1.3 | 1.6 | 1.0 |
| 150 | C | 5.0 | 3.7 | 2.8 | 2.4 | 2.1 | 2.2 | 1.9 | 1.8 | 2.0 | 1.7 |
| Comparative Sample 1 | | | | | | | | | | | |
| 130 | A | 2.5 | 2.1 | 1.6 | 1.6 | 1.5 | 1.2 | 1.2 | 2.0 | 1.4 | 1.3 |
| 140 | A | 3.2 | 2.6 | 2.0 | 2.0 | 1.7 | 1.0 | 1.4 | 1.0 | 1.1 | 1.3 |
| 150 | A | 2.9 | 2.5 | 2.0 | 1.7 | 1.6 | 1.6 | 1.6 | 1.3 | 1.7 | 1.7 |
| Comparative Sample 2 | | | | | | | | | | | |
| 127 | A | 1.3 | 1.0 | 0.8 | 0.7 | 0.6 | 0.6 | 0.6 | 0.6 | 0.5 | 0.5 |

C = Cohesive failure through PSA layer
A = Adhesive delamination between PSA layer and adjacent layer It is specifically intended that the present disclosure not be limited to the embodiments and illustrations contained herein, but include modified forms of those embodiments including portions of the embodiments and combinations of elements of different embodiments as come with the scope of the following claims.

The invention claimed is:

1. A pressure sensitive adhesive composition comprising:
   A) from 30 wt % to 65 wt % of an ethylene/α-olefin multi-block copolymer composed of hard segments and soft segments, the hard segments and the soft segments each comprising ethylene, the ethylene/α-olefin multi-block copolymer having a melt index from 0.2 g/10 min to 3.0 g/10 min;
   B) from 10 wt % to 35 wt % of a styrene-isoprene-styrene block copolymer comprising from 15 wt % to 25 wt % units of polymerized styrene;
   C) from 20 wt % to 40 wt % of a tackifier having a Ring and Ball softening point from 80° C. to 140° C., the tackifier selected from the group consisting of a non-hydrogenated aliphatic $C_5$ resin and a hydrogenated aliphatic $C_5$ resin;
   D) from greater than 0 wt % to 8 wt % of an oil; and
   the composition has (i) a melt index from 3 g/10 min to 50 g/10 min, (ii) a glass transition temperature from −58° C. to −40° C., and (iii) an $I_{10}/I_2$ from 14 to 25.

2. The composition of claim 1 wherein the ethylene/α-olefin multi-block copolymer has a melt index from 0.5 g/10 min to 1.5 g/10 min.

3. The composition of claim 1 wherein the ethylene/α-olefin multi-block copolymer is an ethylene/octene multi-block copolymer.

4. The composition of claim 1, wherein the composition has a density from 0.89 to 0.93 g/cc.

5. The composition of claim 1, wherein the composition has a reclose peel adhesion force from greater than 0.7 N/25 mm to less than 10 N/25 mm.

6. The composition of claim 1 wherein the composition has a dynamic melt viscosity from $5.0 \times 10^5$ mPa-s to $3.0 \times 10^6$ mPa-s.

7. An article comprising at least one component formed from the composition of claim 1.

8. The composition of claim 1, wherein the composition has an $I_{10}/I_2$ from 16 to 25.

9. The composition of claim 1 consisting of
A) ethylene/octene multi-block copolymer;
B) styrene-isoprene-styrene block copolymer;
C) tackifier that is the non-hydrogenated aliphatic $C_5$ resin having a Ring and Ball softening point from 91° C. to 100° C.;
D) oil; and
the composition has (i) a melt index from 5 g/10 min to 30 g/10 min, (ii) a glass transition temperature from −56° C. to −48° C., and (iii) an $I_{10}/I_2$ from 14 to 23.

* * * * *